(12) United States Patent
Miyahara

(10) Patent No.: US 10,503,289 B2
(45) Date of Patent: Dec. 10, 2019

(54) DISPLAY DEVICE

(75) Inventor: Masaki Miyahara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 743 days.

(21) Appl. No.: 13/809,525

(22) PCT Filed: Aug. 25, 2011

(86) PCT No.: PCT/JP2011/069166
§ 371 (c)(1),
(2), (4) Date: Jan. 10, 2013

(87) PCT Pub. No.: WO2012/039230
PCT Pub. Date: Mar. 29, 2012

(65) Prior Publication Data
US 2013/0120304 A1    May 16, 2013

(30) Foreign Application Priority Data
Sep. 24, 2010  (JP) .................... 2010-213794

(51) Int. Cl.
*G06F 3/041* (2006.01)
*G06F 3/0481* (2013.01)
*G06F 3/14* (2006.01)

(52) U.S. Cl.
CPC ............ *G06F 3/041* (2013.01); *G06F 3/0416* (2013.01); *G06F 3/0481* (2013.01); *G06F 3/1423* (2013.01)

(58) Field of Classification Search
CPC ........ G06F 3/1423; G06F 3/041; G06F 3/044; G06F 3/0416; G06F 3/0488;
(Continued)

(56) References Cited

U.S. PATENT DOCUMENTS 5,047,754 A * 9/1991 Akatsuka et al. ............ 345/163
5,784,035 A * 7/1998 Hagiwara et al. ............ 345/1.3
(Continued)

FOREIGN PATENT DOCUMENTS

JP   63-173119   7/1988
JP   4-326152   11/1992
(Continued)

OTHER PUBLICATIONS

International Search Report, PCT/JP2011/069166, dated Nov. 15, 2011.
(Continued)

*Primary Examiner* — Jason M Mandeville
(74) *Attorney, Agent, or Firm* — Young & Thompson

(57) ABSTRACT

When an application displays image straddling display units (110-1 and 110-2), a coordinate conversion unit (120) uses a predetermined operation to transform the physical coordinates indicating the position at which a display unit (110-1 or 110-2) senses contact to virtual coordinates and supplies the virtual coordinates. A coordinate notification unit (130) notifies an application (140) of the physical coordinates at which contact was sensed when the application is displaying the image on one of the display units (110-1 or 110-2) and notifies the application (140) of the virtual coordinates supplied by the coordinate conversion unit (120) when the one application is displaying the image straddling the display units (110-1 and 110-2).

10 Claims, 13 Drawing Sheets

(58) Field of Classification Search
CPC .. G06F 3/04883; G06F 3/0481; G06F 3/1431; G06F 3/1438; G06F 3/1446
USPC .............................. 345/1.1, 1.2, 1.3, 2.1, 2.2
See application file for complete search history.

(56) References Cited

U.S. PATENT DOCUMENTS

| | | | |
|---|---|---|---|
| 6,118,433 A * | 9/2000 | Jenkin et al. | 345/173 |
| 6,377,228 B1 * | 4/2002 | Jenkin et al. | 345/1.3 |
| 8,410,993 B2 * | 4/2013 | Jenks et al. | 345/1.3 |
| 8,952,867 B2 * | 2/2015 | Urawaki | G06F 1/1615 345/1.1 |
| 2002/0018028 A1 | 2/2002 | Kadota | |
| 2007/0120763 A1 * | 5/2007 | De Paepe et al. | 345/1.3 |
| 2008/0209005 A1 | 8/2008 | Akamatsu et al. | |
| 2010/0149103 A1 | 6/2010 | Betts-Lacroix | |
| 2010/0199188 A1 | 8/2010 | Abu-Hakima et al. | |
| 2010/0201645 A1 | 8/2010 | Asami | |
| 2011/0273387 A1 * | 11/2011 | Urawaki | G06F 1/1615 345/173 |
| 2012/0194456 A1 * | 8/2012 | Fujii et al. | 345/173 |

FOREIGN PATENT DOCUMENTS

| | | |
|---|---|---|
| JP | 11-161426 | 6/1999 |
| JP | 2000-112597 | 4/2000 |
| JP | 2001-154804 | 6/2001 |
| JP | 2003-069767 | 3/2003 |
| JP | 2004-070635 | 3/2004 |

OTHER PUBLICATIONS

Extended European search report, dated Jul. 1, 2016; Application No. 11826676.6.
Chinese Office Action dated Apr. 1, 2015 in corresponding Chinese Patent Application No. 201180042651.1 with English translation of Chinese Office Action.

* cited by examiner

Notification of physical coordinates (x, y) to the application.

Notification of physical coordinates (x, y) to the application.

Conversion to virtual coordinates.

Fig.13

| | Origin of occurrence of event | 0° rotation | 90° rotation | 180° rotation | 270° rotation |
|---|---|---|---|---|---|
| Display on one screen | — | x'=x<br>y'=y | x'=y<br>y'=w-x | x'=w-x<br>y'=h-y | x'=h-y<br>y'=x |
| Display on two screens | Primary | x'=x<br>y'=y | x'=y<br>y'=w-x+w | x'=w-x+w<br>y'=h-y | x'=h-y<br>y'=x |
| | Secondary | x'=x+w<br>y'=y | x'=y<br>y'=w-x | x'=w-x<br>y'=h-y | x'=h-y<br>y'=x+w |

DISPLAY DEVICE

TECHNICAL FIELD

The present invention relates to a display device that displays information, a coordinate notification method in a display device, and a program, and more particularly to a display device that displays information on a plurality of displays, a coordinate notification method in a display device, and a program.

BACKGROUND ART

In recent years, technique are being considered in which a plurality of display units (displays) are arranged in a row and then, by linking and controlling the aligned plurality of displays, using the displays as if the display size were much larger.

In this technique, when the displays are provided with a touch panel function, the physical coordinates on each of the displays are notified to an application that is displaying an image after being converted to virtual coordinates of the entire aligned plurality of displays (for example, see Patent Document 1).

Literature of the Prior Art

Patent Documents

Patent Document 1: Japanese Unexamined Patent Application Number H11-161426

SUMMARY OF THE INVENTION

Problem to be Solved by the Invention

When implementing display by using only one display among a plurality of displays, converting from physical coordinates to virtual coordinates is unnecessary.

Nevertheless, the conversion from physical coordinates to virtual coordinates is required in the above-described technique, and the problem therefore arises in which resources are wasted due to unnecessary processing.

It is an object of the present invention to provide a display device, a coordinate notification method, and a program that solve that above-described problem.

Means for Solving the Problem

The display device of the present invention includes:
a plurality of display units that are equipped with a touch panel function and that display an image that is information;
a coordinate conversion unit that, when one application is displaying the image straddling the plurality of display units, uses a predetermined operation to convert physical coordinates that indicate the position at which a display unit senses contact to virtual coordinates; and
a coordinate notification unit that, when one application is displaying the image on one display unit among the plurality of display units, reports the physical coordinates at which the display unit senses contact to the application, and when one application is displaying the image straddling the plurality of display units, reports the virtual coordinates to the application.

The coordinate notification method of the present invention is a coordinate notification method in a device that is equipped with a plurality of displays having a touch panel function and includes steps of:
sensing contact to the plurality of displays;
judging whether one application is displaying the image straddling the plurality of displays;
when one application is displaying the image straddling the plurality of displays, using a predetermined operation to convert the physical coordinates that indicate the position at which the contact is sensed to virtual coordinates;
when one application is displaying the image on one display among the plurality of displays, reporting the physical coordinates at which the contact is sensed to the application; and
when one application is displaying the image straddling the plurality of displays, reporting the virtual coordinates to the application.

The program of the present invention is a program for causing a device that is equipped with a plurality of displays that have a touch panel function and that display an image that is information to execute:
a procedure of sensing contact to the plurality of displays;
a procedure of judging whether one application is displaying the image straddling the plurality of displays;
a procedure of, when one application is displaying the image straddling the plurality of displays, using a predetermined operation to convert physical coordinates that indicate the position at which contact is sensed to virtual coordinates;
a procedure of, when one application is displaying the image on one display among the plurality of displays, reporting the physical coordinates at which the contact is sensed to the application, and
a procedure of, when one application is displaying the image straddling the plurality of displays, reporting the virtual coordinates to the application.

Effect of the Invention

As described hereinabove, in the present invention, coordinates can be effectively reported to an application in a device that is equipped with a plurality of displays.

BRIEF DESCRIPTION OF THE DRAWINGS

FIG. 13 is a table showing the formulas of coordinate conversion resulting from rotation of the vertical and horizontal directions of the above-described display device.

BEST MODE FOR CARRYING OUT THE INVENTION

An exemplary embodiment of the present invention is next described with reference to the accompanying drawings.

Figure 1:
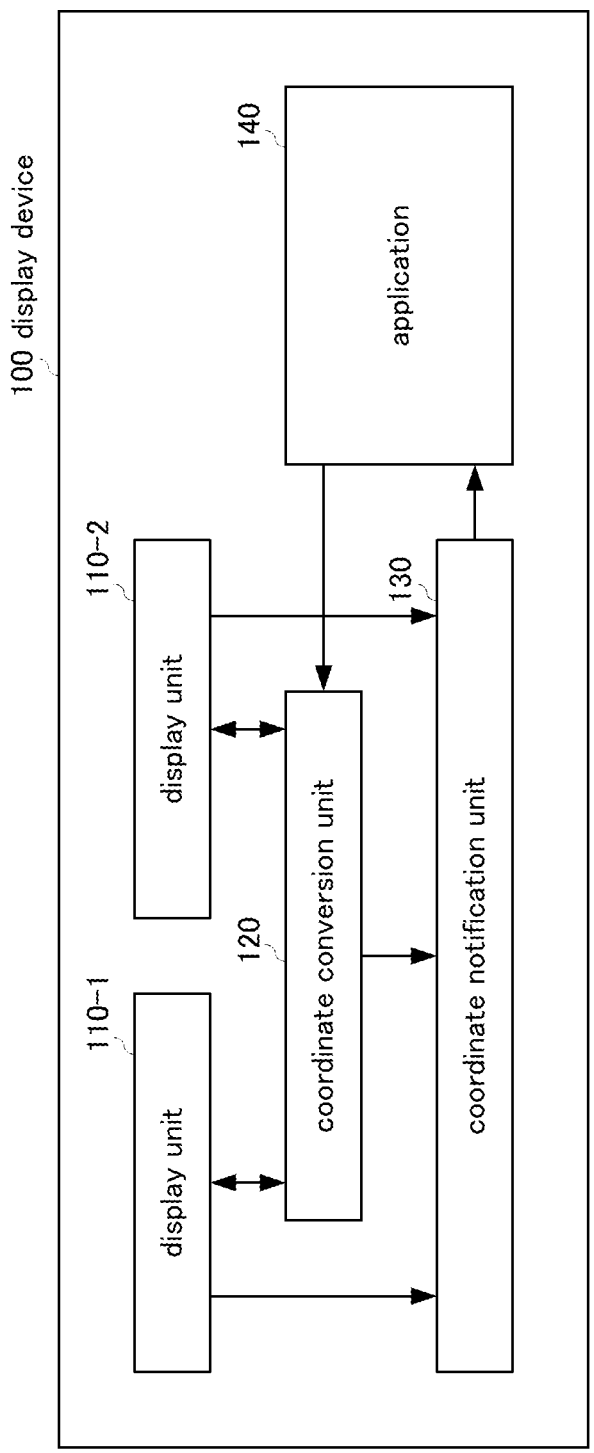
FIG. 1 shows an exemplary embodiment of the display device of the present invention.

FIG. 1 shows an exemplary embodiment of the display device of the present invention.

As shown in FIG. 1, display device 100 in the present exemplary embodiment is provided with a plurality of display units 110-1 and 110-2, coordinate conversion unit 120, and coordinate notification unit 130. Display device 100 is further equipped with application 140 that operates in display device 100. In FIG. 1, a case is shown in which display device 100 is equipped with one application, but it goes without saying that display device 100 may be equipped with two or more applications.

Display units 110-1 and 110-2 are displays that are equipped with a touch panel function and that display images that are information. In FIG. 1, a form is shown in which there are two display units, but three or more display units may be provided.

Coordinate conversion unit 120 uses a predetermined operation to convert the physical coordinates that indicate a position at which display units 110-1 and 110-2 sense contact to virtual coordinates when application 140 is displaying an image straddling display unit 110-1 and display unit 110-2.

At this time, when display unit 110-1 displays an image that includes the coordinates of an origin recognized by application 140, coordinate conversion unit 120 converts the physical coordinates on display unit 110-2 to virtual coordinates. When display unit 110-2 displays an image that contains the coordinates of an origin recognized by application 140, coordinate conversion unit 120 converts the physical coordinates on display unit 110-1 to virtual coordinates.

At this time, coordinate conversion unit 120 converts, from among the physical coordinates, the coordinate in the direction along which display unit 110-1 and display unit 110-2 are aligned. In other words, when display unit 110-1 and display unit 110-2 are aligned in a horizontal direction, coordinate conversion unit 120 converts the coordinates of the horizontal direction. For example, when the horizontal direction is the X-axis, coordinate conversion unit 120 converts the X coordinates. Alternatively, when display unit 110-1 and display unit 110-2 are aligned in the vertical direction, coordinate conversion unit 120 converts the coordinates of the vertical direction. For example, when the vertical direction is the Y-axis, coordinate conversion unit 120 converts the Y coordinates.

At this time, when display unit 110-1 includes the coordinates of an origin that is recognized by application 140, coordinate conversion unit 120 carries out conversion to virtual coordinates by adding a coordinate portion that accords with the size of display unit 110-1 to the physical coordinates on display unit 110-2. Alternatively, when display unit 110-2 includes the coordinates of an origin that is recognized by application 140, coordinate conversion unit 120 carries out conversion to virtual coordinates by adding a coordinate portion that accords with the size of display unit 110-2 to the physical coordinates on display unit 110-1.

In addition, coordinate conversion unit 120 converts physical coordinates to virtual coordinates in accordance with the movement of the physical coordinates that correspond to the origin that application 140 recognizes resulting from the rotation of the length and width of display device 100.

Coordinate conversion unit 120 further supplies the converted virtual coordinates to coordinate notification unit 130.

Coordinate notification unit 130 reports the physical coordinates at which display unit 110-1 senses contact to application 140 when application 140 is displaying an image on only display unit 110-1. When application 140 is displaying an image on only display unit 110-2, coordinate notification unit 130 reports the physical coordinates at which display unit 110-2 senses contact to application 140. When virtual coordinates are supplied from coordinate conversion unit 120, coordinate notification unit 130 reports the virtual coordinates to application 140.

The coordinate notification method in display device 100 shown in FIG. 1 is next described.

Figure 2:
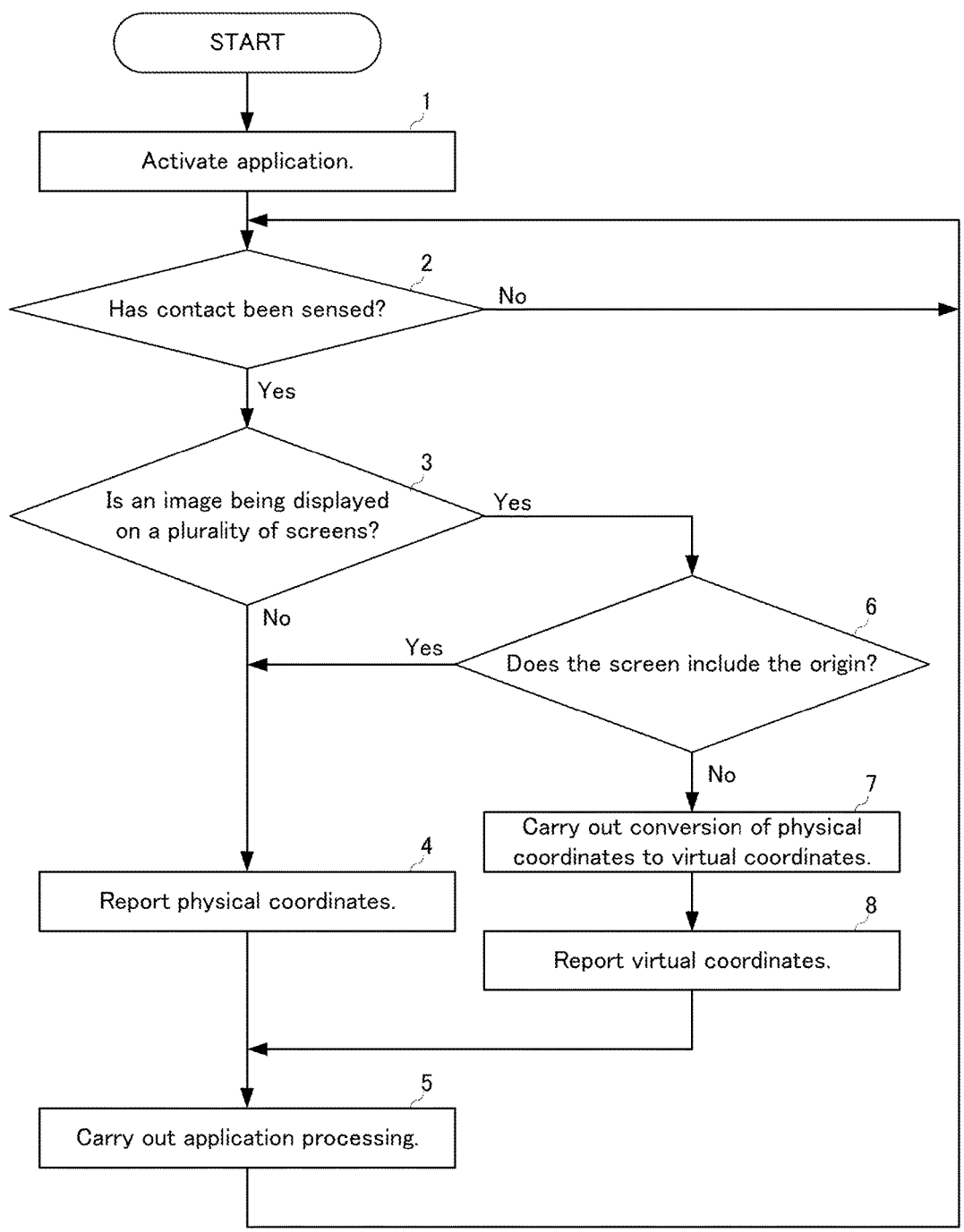
FIG. 2 is a flow chart for describing the coordinate notification method in the display device shown in FIG. 1.

FIG. 2 is a flow chart for describing the coordinate notification method in display device 100 shown in FIG. 1.

When application 140 that is installed in display device 100 is first activated in Step 1, it is first judged in Step 2 whether contact was sensed in display unit 110-1 or display unit 110-2.

This operating method of application 140 may be a typical method such as is realized by carrying out predetermined input and no particular stipulations are imposed here.

In addition, in judging whether contact is sensed in display unit 110-1 or display unit 110-2, judgment is made using the touch panel function provided in display units 110-1 and 110-2.

When it is judged that contact is sensed in display unit 110-1 or display unit 110-2, coordinate conversion unit 120 next judges in Step 3 whether application 140 that is currently operating is displaying an image straddling display unit 110-1 and display unit 110-2. No particular stipulation is imposed regarding this judgment method. In addition, the component that makes this judgment need not be coordinate conversion unit 120. For example, this judgment may be carried out by a control unit (not shown) that controls the entirety of display device 100.

When it is judged that application 140 that is currently operating is not displaying an image straddling display unit 110-1 and display unit 110-2, i.e., when application 140 that is currently operating is displaying an image only on display unit 110-1 or is displaying an image only on display unit 110-2, the physical coordinates at which contact is sensed are communicated from coordinate notification unit 130 to application 140 in Step 4.

To describe this operation by offering an actual example, when application 140 that is currently operating is displaying an image on only display unit 110-1 and contact is sensed on display unit 110-1, the physical coordinates on display unit 110-1 at which contact is sensed are communicated from coordinate notification unit 130 to application 140 without alteration. When application 140 that is currently operating is displaying an image on only display unit 110-2 and contact is sensed on display unit 110-2, the physical coordinates on display unit 110-2 at which contact is sensed are communicated from coordinate notification unit 130 to application 140 without alteration.

Figure 3:
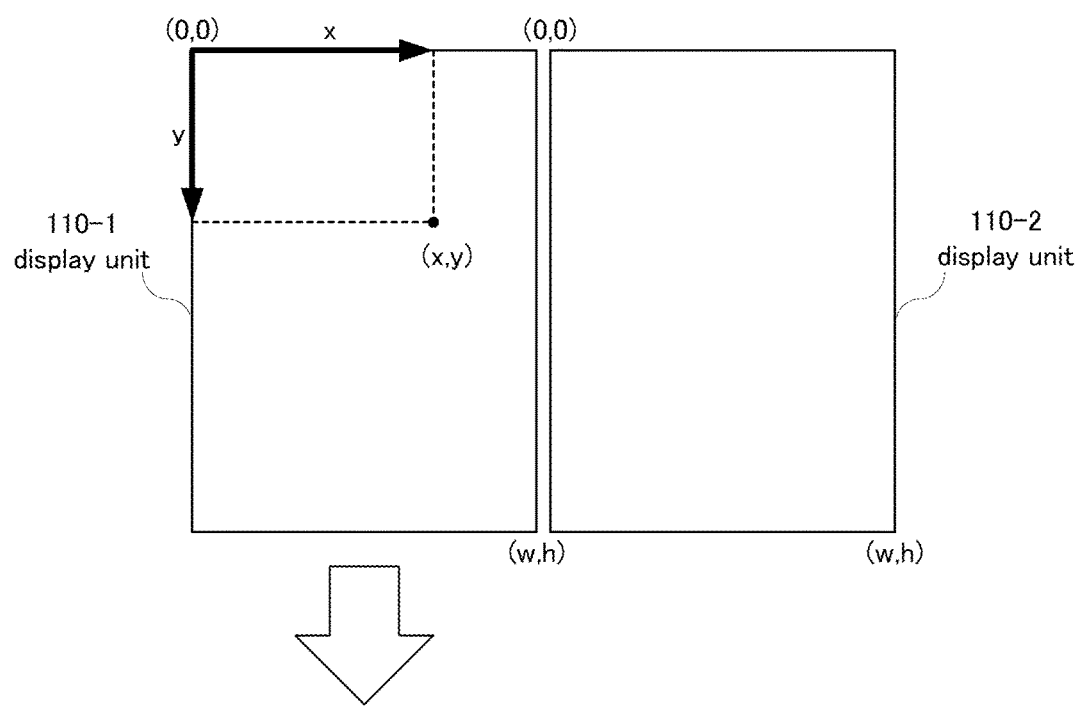
FIG. 3 is a view for describing an example of coordinates that are reported by the coordinate notification unit when an application that is currently active displays an image on only one display unit and contact is sensed on that display unit.

FIG. 3 is a view for describing an example of coordinates that coordinate notification unit 130 reports when application 140 that is currently operating is displaying an image on only display unit 110-1 and contact is sensed on display unit 110-1. Here, the physical coordinates of the upper left corner of display unit 110-1 are (0, 0) (origin), the X-axis being the horizontal direction and the Y-axis being the vertical direction. In addition, the physical coordinates of the lower right corner are (w, h). The size of display unit 110-2 is the same as the size of display unit 110-1, and the coordinates of the origin and the coordinate axis is the same as for display unit 110-1.

As shown in FIG. 3, when contact is sensed at the physical coordinates (x, y) on display unit 110-1, these physical coordinates (x, y) are reported to application 140 from coordinate notification unit 130 without alteration. In other words, conversion from physical coordinates to virtual coordinates is not implemented in coordinate conversion unit 120.

Figure 4:
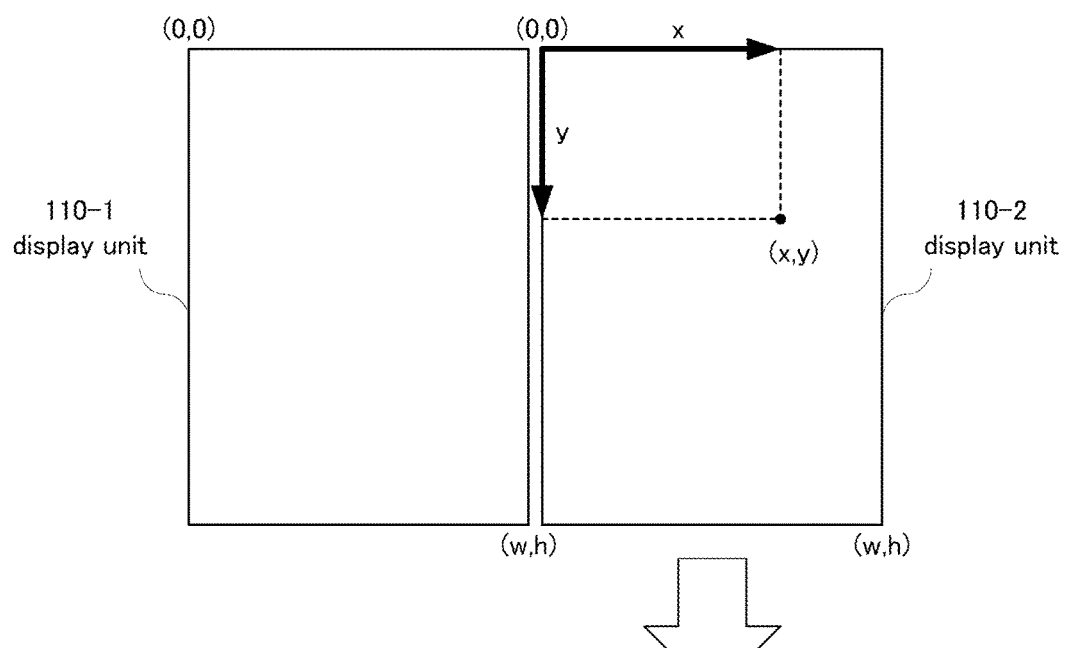
FIG. 4 is a view for describing an example of coordinates that are reported by the coordinate notification unit when an application that is currently active displays an image on only one display unit and contact is sensed on that display unit.

FIG. 4 is a view for describing an example of coordinates that are reported by coordinate notification unit 130 when application 140 that is currently operating is displaying an image on only display unit 110-2 and contact is sensed on display unit 110-2. The origin and coordinate axes on display units 110-1 and 110-2 are the same as shown in FIG. 3. In addition, display unit 110-1 and display unit 110-2 have the same size.

As shown in FIG. 4, when contact is sensed at physical coordinates (x, y) on display unit 110-2, these physical coordinates (x, y) are communicated from coordinate notification unit 130 to application 140 without alteration. In other words, conversion from physical coordinates to virtual coordinates is not carried out at coordinate conversion unit 120.

When physical coordinates are communicated from coordinate notification unit 130 to application 140, processing that accords with the physical coordinates is carried out in application 140 in Step 5.

On the other hand, when it is determined in Step 3 that application 140 that is currently operating is displaying an image straddling display unit 110-1 and display unit 110-2, coordinate conversion unit 120 judges in Step 6 whether the display unit at which contact is sensed in Step 2 includes the coordinates of the origin (origin on application 140) that is recognized by application 140.

In order for application 140 that is operating to display an image, there are coordinates of an origin that are recognized by application 140. When the coordinates of this origin are included in the display unit in which contact is sensed, i.e., when the origin of the physical coordinates on the display unit and the origin recognized by application 140 are the same, conversion of the physical coordinates is not necessary.

For example, when contact is sensed on display unit 110-1 in Step 2, coordinate conversion unit 120 judges whether the coordinates of the origin recognized by application 140 are contained in display unit 110-1 (the origin in display unit 110-1 and the origin recognized by application 140 are the same). When contact is sensed on display unit 110-2 in Step 2, coordinate conversion unit 120 judges whether the coordinates of the origin recognized by application 140 are contained on display unit 110-2 (the origin on display unit 110-2 and the origin recognized by application 140 are the same).

When it is determined in Step 6 that the display unit on which contact is sensed in Step 2 is the unit that includes the coordinates of the origin that are recognized by application 140, the physical coordinates at which contact is sensed are communicated from coordinate notification unit 130 to application 140 in Step 4.

Figure 5:
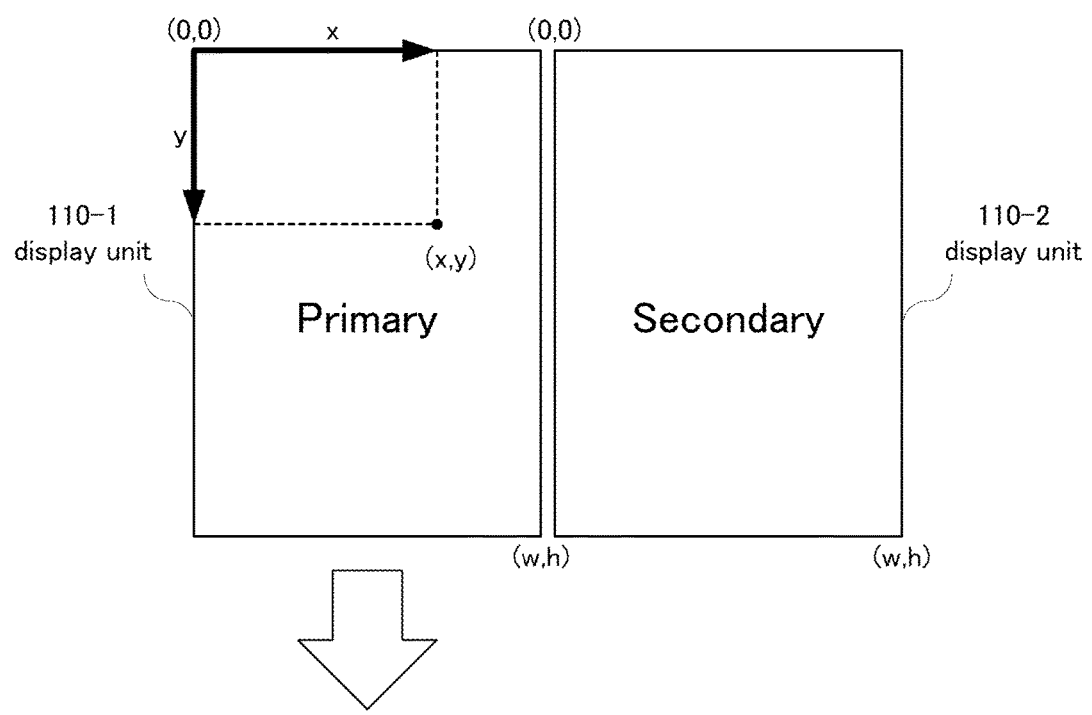
FIG. 5 is a view for describing an example of the notification of coordinates when contact is sensed on a display unit that includes the coordinates of an origin recognized by the application.

FIG. 5 is a view for describing an example of the notification of coordinates when contact is sensed in display unit 110-1 that includes the coordinates of the origin that are recognized by application 140. Here, application 140 that is currently operating is displaying an image straddling display unit 110-1 that is the primary display and display unit 110-2 that is the secondary display, and the coordinates of the origin that are recognized by application 140 are the origin of the physical coordinates on display unit 110-1.

As shown in FIG. 5, when contact is sensed at physical coordinates (x, y) on display unit 110-1, these physical coordinates (x, y) are reported from coordinate notification unit 130 to application 140 without alteration. This is because, as described hereinabove, the origin of the physical coordinates on display unit 110-1 and the origin that is recognized by application 140 are identical, and the conversion from physical coordinates to virtual coordinates is therefore unnecessary.

On the other hand, when it is judged in Step 6 that the display unit on which contact is sensed in Step 2 is not the unit that includes the coordinates of the origin that is recognized by application 140, a predetermined operation is used by coordinate conversion unit 120 to convert the physical coordinates to virtual coordinates in Step 7.

Figure 6:
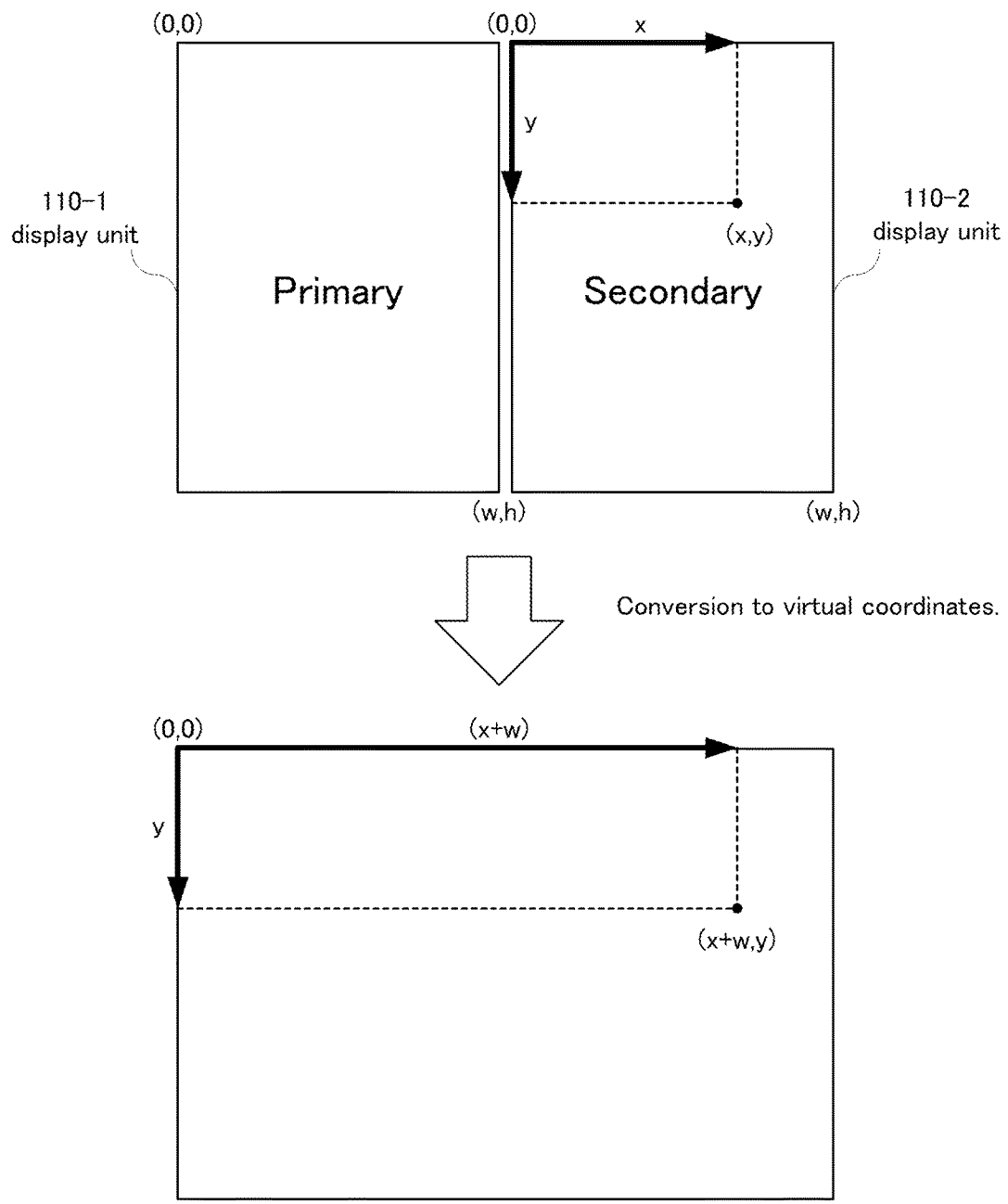
FIG. 6 is a view for describing an example of notification of coordinates when contact is sensed on a display unit that does not include the coordinates of an origin recognized by the application.

FIG. 6 is a view for describing an example of the notification of coordinates when contact is sensed on display unit 110-2 that does not include the coordinates of the origin that is recognized by application 140. Here, application 140 that is currently operating is displaying an image straddling display unit 110-1 that is the primary display and display unit 110-2 that is the secondary display and the coordinates of the origin that application 140 recognizes are the origin of the physical coordinates on display unit 110-1.

As shown in FIG. 6, when contact is sensed at physical coordinates (x, y) on display unit 110-2, these physical coordinates (x, y) are converted to virtual coordinates by coordinate conversion unit 120.

In the example shown in FIG. 6, display unit 110-1 and display unit 110-2 are arranged in a horizontal direction (X-axis direction), and "w" is the coordinate that accords with the size of display unit 110-1 in the X-axis direction. As a result, the formula for converting from physical coordinates to virtual coordinates for X coordinates is as shown in Formula 1.

(Formula 1)

$$x(\text{physical coordinates} + w(\text{the size of display unit 110-1 in the } X\text{-axis direction}) = (x+w) \tag{1}$$

Coordinate conversion unit 120 thus finds the virtual coordinates by adding the size of display unit 110-1 to the physical coordinates.

Because display unit 110-1 and display unit 110-2 are not arranged in a vertical direction (Y-axis direction), conversion of the Y coordinate is not carried out.

Accordingly, physical coordinates (x, y) are converted by coordinate conversion unit 120 to virtual coordinates (x+w, y).

In Step 7, when conversion from physical coordinates to virtual coordinates has been carried out by coordinate conversion unit 120, the virtual coordinates that have been converted are supplied from coordinate conversion unit 120 to coordinate notification unit 130.

In Step 8, the virtual coordinates from coordinate notification unit 130 are communicated to application 140, and processing that accords with the virtual coordinates is carried out in application 140 in Step 5.

The above-described processing can be applied to cases in which the number of display units is three, four, or more.

Figure 7:
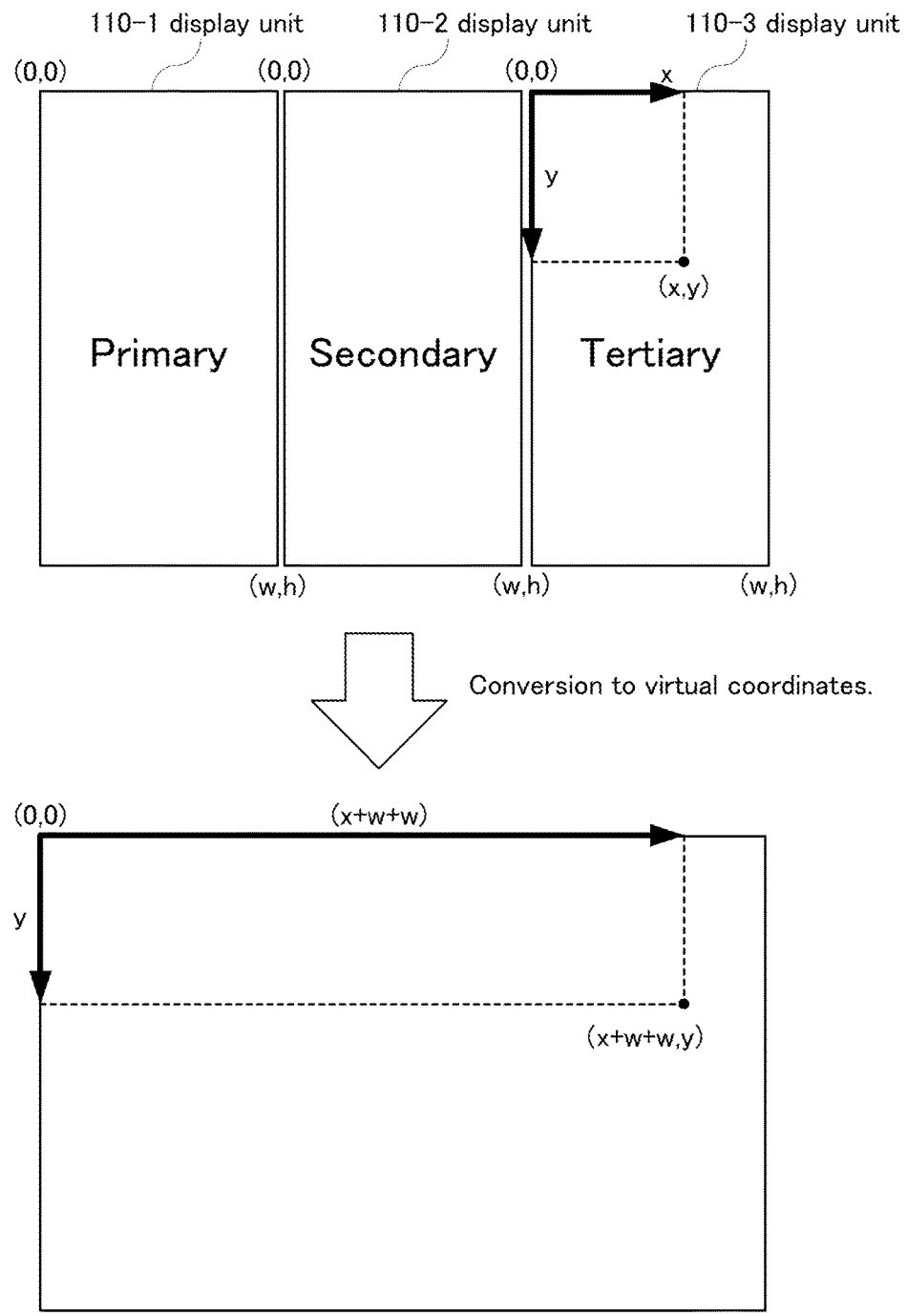
FIG. 7 is a view for describing an example of the conversion of coordinates when there are three display units.

FIG. 7 is a view for describing an example of the conversion of coordinates when there are three display units.

In the example shown in FIG. 7, display device 100 is equipped with three display units 110-1-110-3, display unit 110-1 that is the primary display, display unit 110-2 that is the secondary display, and display unit 110-3 that is the tertiary display being arranged in a horizontal direction (X-axis direction).

In addition, the coordinates of the origin that application 140 recognizes are the same as the origin (upper left corner) of the physical coordinates on display unit 110-1.

The size of each of the three display units 110-1-110-3 is (w×h) when indicated by coordinates.

As shown in FIG. 7, when display device 100 is equipped with display units 110-1-110-3, the coordinates that are communicated when contact is sensed on display unit 110-1 or display unit 110-2 are the same as for a case in which two displays are provided as described hereinabove. In other words, as previously described, when contact is sensed on display unit 110-1, the physical coordinates at which contact is sensed are reported by coordinate notification unit 130 to application 140 without alteration. When contact is sensed on display unit 110-2, coordinate conversion unit 120 uses Formula 1 to convert the physical coordinates at which the contact is sensed to virtual coordinates, following which coordinate notification unit 130 communicates the virtual coordinates to application 140.

When contact is sensed at physical coordinates (x, y) on display unit 110-3, the conversion from physical coordinates to virtual coordinates for the X coordinate is carried out in coordinate conversion unit 120.

More specifically, conversion is carried out using the following Formula 2:

Formula 2

$$x(\text{physical coordinate}) + w(\text{the size of display unit 110-1 in the } X\text{-axis direction}) + w(\text{the size of display unit 110-2 in the } X\text{-axis direction}) = (x + w + w) \qquad 2$$

This (x+w+w) is the X coordinate of the virtual coordinates.

In addition, because display unit 110-1, display unit 110-2, and display unit 110-3 are not aligned in the vertical direction (Y-axis direction), conversion is not carried out for the Y coordinate.

Accordingly, the virtual coordinates that are communicated from coordinate notification unit 130 to application 140 are (x+w+w, y). Application 140 carries out processing according to these coordinates (x+w+w, y).

Figure 8:
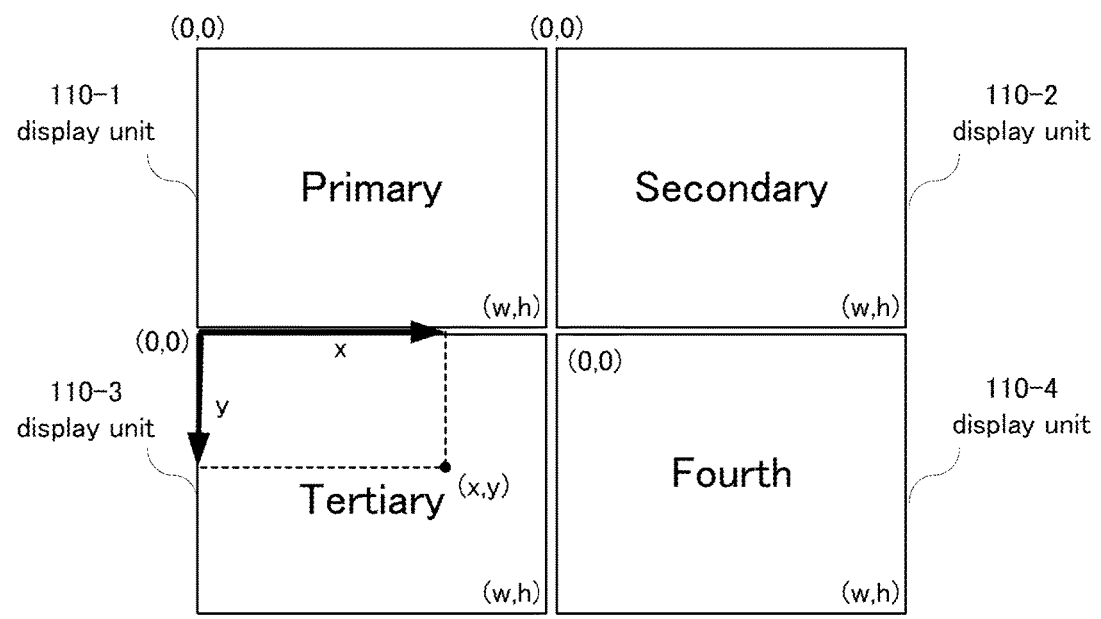
FIG. 8 is a view for describing an example of the conversion of coordinates when there are four display units.
Figure 8:
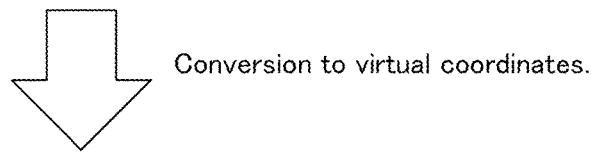
Figure 8:
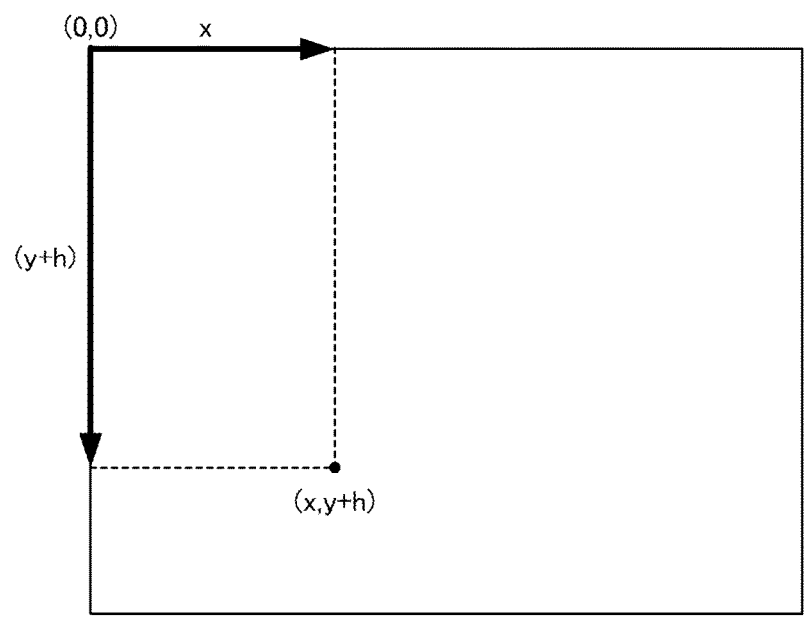

FIG. 8 is a view for describing an example of the conversion of coordinates when there are four display units.

In the example shown in FIG. 8, four display units 110-1-110-4 are mounted in display device 100, display unit 110-1 that is the primary display and display unit 110-2 that is the secondary display being mounted arranged in a horizontal direction (X-axis direction). Further, display unit 110-3 that is the tertiary display and display unit 110-4 that is the fourth display are mounted aligned in a horizontal direction (X-axis direction). In addition, display unit 110-1 that is the primary display and display unit 110-3 that is the tertiary display are mounted aligned in a vertical direction (Y-axis direction). Still further, display unit 110-2 that is the secondary display and display unit 110-4 that is the fourth display are mounted aligned in a vertical direction (Y-axis direction).

The coordinates of the origin recognized by application 140 are the same as the origin of the physical coordinates (upper left corner) on display unit 110-1.

The size of each of the four display units 110-1-110-4 is (w×h) when indicated by coordinates.

As shown in FIG. 8, when display device 100 is equipped with display units 110-1-110-4, the coordinates that are reported when contact is sensed in display unit 110-1 or display unit 110-2 are the same as for a display device that is equipped with two displays as described hereinabove. In other words, as previously described, when contact is sensed on display unit 110-1, the physical coordinates at which contact is sensed are reported by coordinate notification unit 130 to application 140 without alteration. When contact is sensed on display unit 110-2, coordinate conversion unit 120 uses Formula 1 to convert the physical coordinates at which contact is sensed to virtual coordinates, following which coordinate notification unit 130 notifies application 140.

When contact is sensed at physical coordinates (x, y) on display unit 110-3, conversion from the physical coordinates to virtual coordinates is carried out for the Y coordinate in coordinate conversion unit 120.

More specifically, conversion is carried out using the following Formula 3:

Formula 3

$$y(\text{physical coordinate}) + h(\text{size of display unit 110-1 in the } Y\text{-axis direction}) = (y + h) \qquad 3$$

This (y+h) is the Y coordinate of the virtual coordinates.

In addition, because display unit 110-1 and display unit 110-3 are not aligned in a horizontal direction (X-axis direction), conversion is not carried out for the X coordinate.

Accordingly, the virtual coordinates that are reported from coordinate notification unit 130 to application 140 are (x, y+h). Application 140 carries out processing according to these coordinates (x, y+h).

Figure 9:
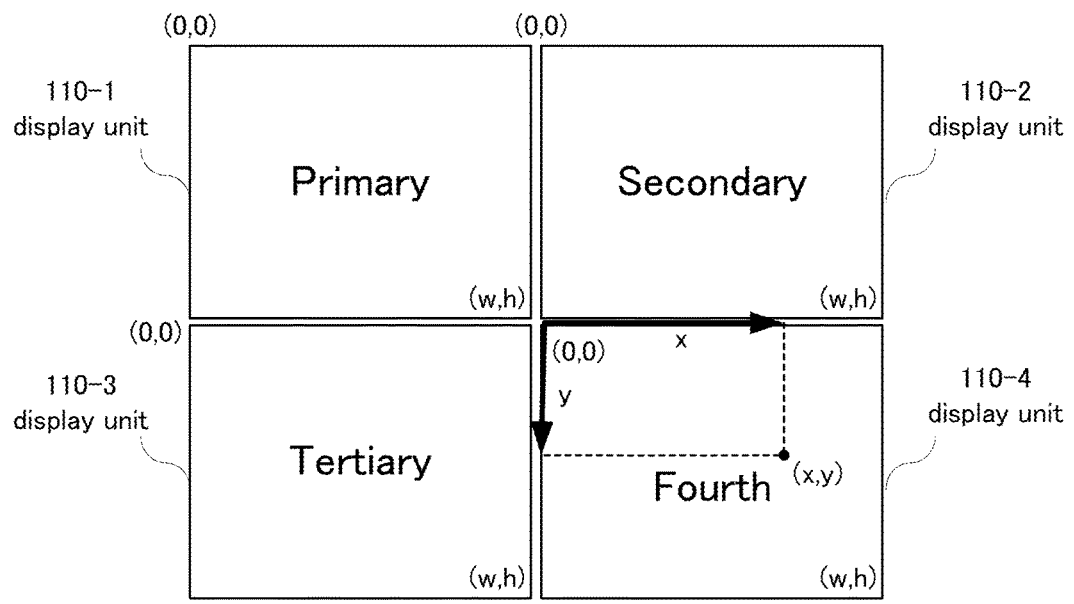
FIG. 9 is a view for describing another example of the conversion of coordinates when there are four display units.
Figure 9:
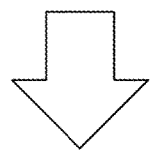
Figure 9:
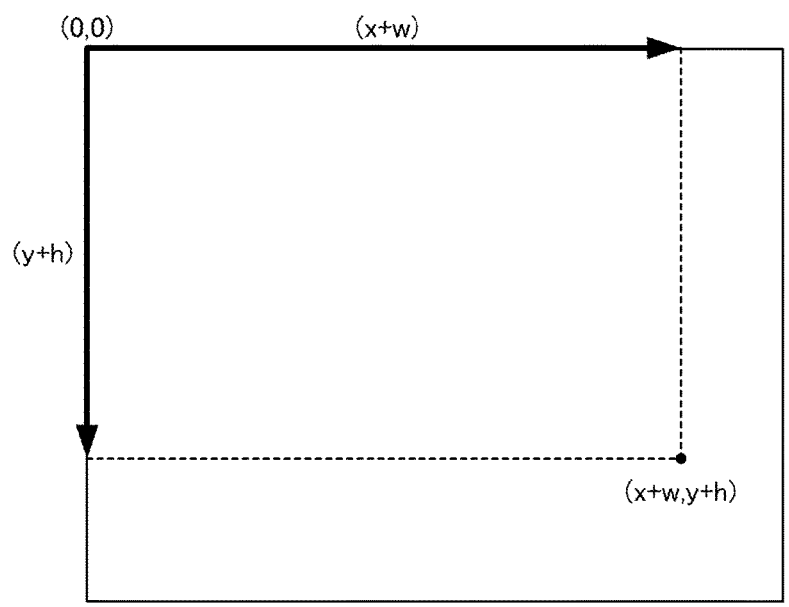

FIG. 9 is a view for describing another example of the conversion of coordinates when there are four display units.

In the example shown in FIG. 9, the arrangement and size of display units 110-1-110-4 is the same as shown in FIG. 8.

In addition, the coordinates of the origin that are recognized by application 140 are the same as the origin of the physical coordinates (upper left corner) on display unit 110-1.

As shown in FIG. 9, when display device 100 is equipped with display units 110-1-110-4, the coordinates that are reported when contact is sensed on display unit 110-1 or display unit 110-2 are the same as for a display device that is equipped with two displays as described hereinabove. In other words, as previously described, when contact is sensed on display unit 110-1, the physical coordinates at which contact is sensed are reported by coordinate notification unit 130 to application 140 without alteration. When contact is sensed on display unit 110-2, coordinate conversion unit 120 uses Formula 1 to convert the physical coordinates at which contact is sensed to virtual coordinates, following which coordinate notification unit 130 notifies application 140.

When contact is sensed at physical coordinates (x, y) on display unit 110-4, conversion from physical coordinates to virtual coordinates is carried out in coordinate conversion unit 120 for each of the X coordinate and the Y coordinate.

More specifically, the following Formula 4 and Formula 5 are used to carry out conversion.

First, for the X coordinate:

Formula 4

$$x(\text{physical coordinate}) + w(\text{the size of display unit 110-1 in the X-axis direction}) = (x+w) \qquad 4$$

This (x+w) is the X coordinate of the virtual coordinates. For the Y coordinate:

Formula 5

$$y(\text{physical coordinate}) + h(\text{the size of display unit 110-2 in the Y-axis direction}) = (y+h) \qquad 5$$

This (y+h) is the Y coordinate of the virtual coordinates.

Accordingly, the virtual coordinates that are reported from coordinate notification unit 130 to application 140 are (x+w, y+h). Application 140 carries out processing in accordance with these coordinates (x+w, y+h).

The notification of coordinates resulting from rotation of the directions of length and width of display device 100 is next described.

In recent years, display devices are increasingly provided with the capability of rotating the directions of length and width of display and switching the vertical orientation in accordance with the orientation of the display device in which the displays are mounted.

The display device of the present invention is also equipped with this capability.

In display device 100 shown in FIG. 1, the notification of the coordinates resulting from the rotation of the length and width of display device 100 when application 140 is displaying an image on one of display unit 110-1 and display unit 110-2 is the same as in a typically used display device.

When application 140 is displaying an image straddling display unit 110-1 and display unit 110-2, the physical coordinates for the origin that application 140 recognizes in some cases moves across display units 110-1 and 110-2 and thus necessitates conversion of coordinates for this movement.

Figure 10:
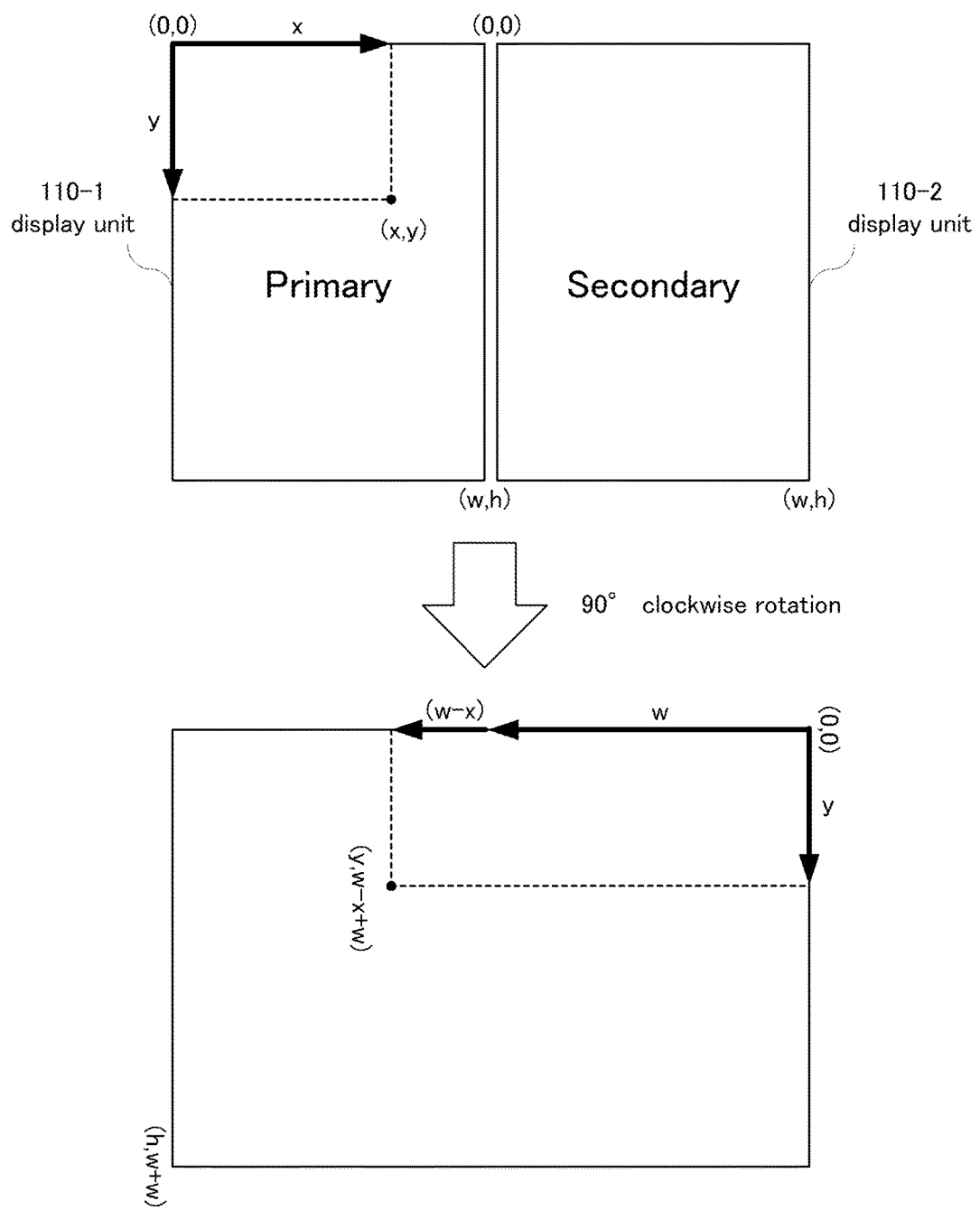
FIG. 10 shows an example of coordinate conversion when the directions of length and width of a display device are rotated clockwise 90°.

FIG. 10 shows an example of the conversion of coordinates when the directions of width and length of display device 100 rotate clockwise 90 degrees.

Physical coordinates (x, y) on display unit 110-1 shown in FIG. 10 are reported by coordinate notification unit 130 to application 140 without alteration if display device 100 is not rotated.

However, as shown in the lower portion of FIG. 10, if display device 100 is rotated clockwise 90 degrees, the physical coordinates corresponding to the origin that application 140 recognizes move from display unit 110-1 to display unit 110-2, whereupon physical coordinates (x, y) and the physical coordinates that correspond to the origin that application 140 recognizes are contained in display units that differ from each other.

With this change, the physical coordinates (x, y) on display unit 110-1 are converted to virtual coordinates by coordinate conversion unit 120.

More specifically, regarding Y coordinates, the physical coordinate (y) on display unit 110-1 becomes the X coordinate of the virtual coordinates Further, coordinate conversion unit 120 uses Formula 6 to carry out conversion for Y coordinates.

Formula 6

$$w(\text{size of display unit 110-1 in the X-axis direction}) - x(\text{physical coordinate}) + w(\text{size of display unit 110-2 in the X-axis direction}) = (w-x+w) \qquad 6$$

This (w–x+w) becomes the Y coordinate of the virtual coordinates.

Accordingly, the virtual coordinates that are reported from coordinate notification unit 130 to application 140 are (y, w–x+w). Application 140 carries out processing in accordance with these coordinates (y, w–x+w).

Figure 11:
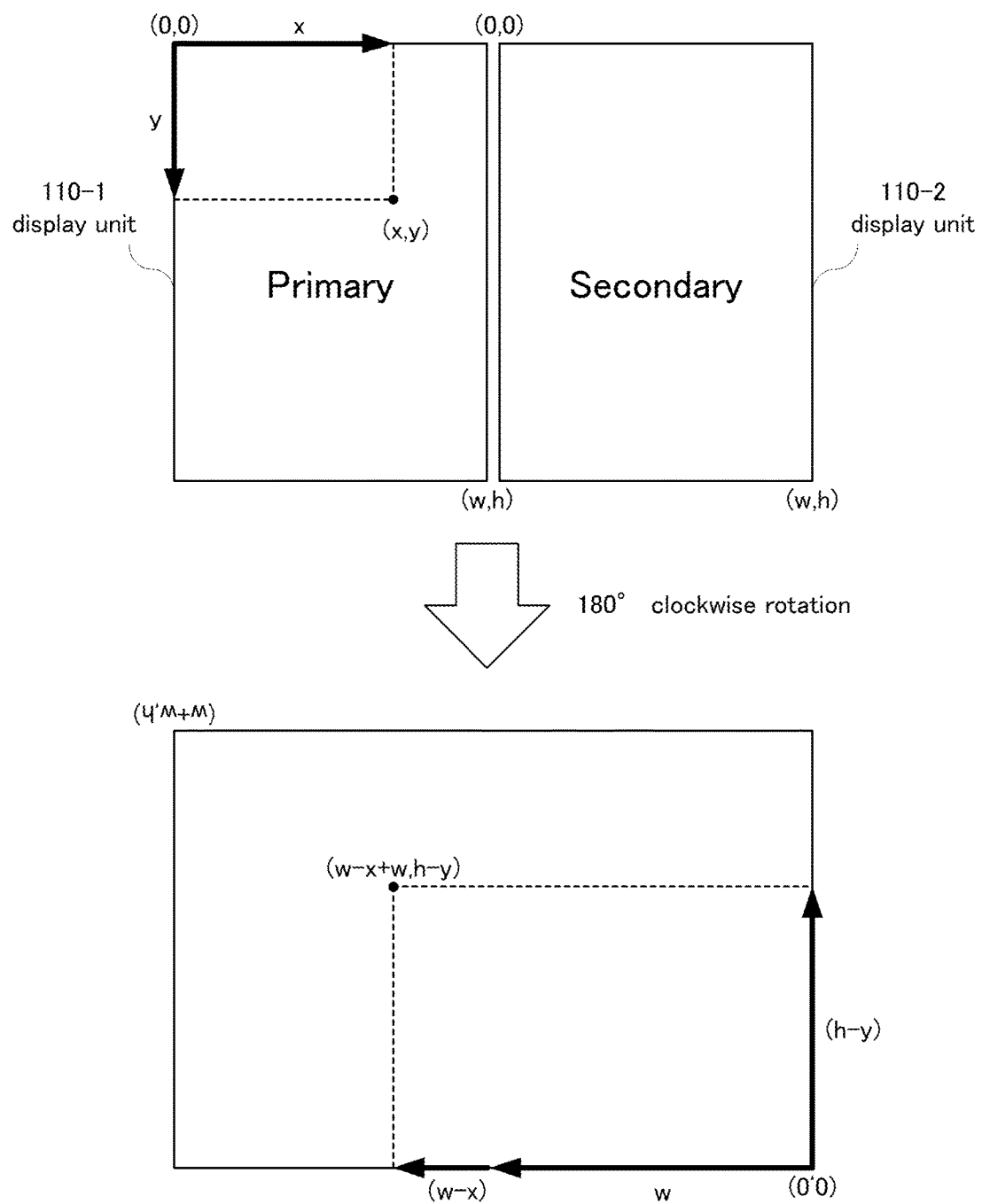
FIG. 11 shows an example of coordinate conversion when the directions of length and width of a display device are rotated clockwise 180°.

FIG. 11 shows an example of the conversion of coordinates when the directions of length and width of display device 100 rotate clockwise 180 degrees.

The physical coordinates (x, y) on display unit 110-1 shown in FIG. 11 are reported by coordinate notification unit 130 to application 140 without alteration if display device 100 is not rotated.

However, as shown in the lower portion of FIG. 11, if display device 100 is rotated clockwise 180 degrees, i.e., if the vertical orientation of display device 100 is switched, the physical coordinates corresponding to the origin that application 140 recognizes move from display unit 110-1 to display unit 110-2, whereupon the physical coordinates (x, y) and the physical coordinates that correspond to the origin that application 140 recognizes are contained in display units that differ from each other.

With this change, the physical coordinates (x, y) on display unit 110-1 are converted to virtual coordinates by coordinate conversion unit 120.

More specifically, coordinate conversion unit 120 uses Formula 7 to convert X coordinates.

Formula 7

$$w(\text{size of display unit 110-1 in the X-axis direction}) - x(\text{physical coordinate}) + w(\text{size of display unit 110-2 in the X-axis direction}) = (w-x+w) \qquad 7$$

This (w–x+w) becomes the X coordinate of the virtual coordinates.

Further, coordinate conversion unit 120 uses Formula 8 to convert Y coordinates.

Formula 8

$$h(\text{size of display unit 110-1 in the Y-axis direction}) - y(\text{physical coordinate}) = (h-y) \qquad 8$$

This (h–y) becomes the Y coordinate of the virtual coordinates.

Accordingly, the virtual coordinates that are reported from coordinate notification unit 130 to application 140 are (w–x+w, h–y). Application 140 carries out processing in accordance with these coordinates (w–x+w, h–y).

Figure 12:
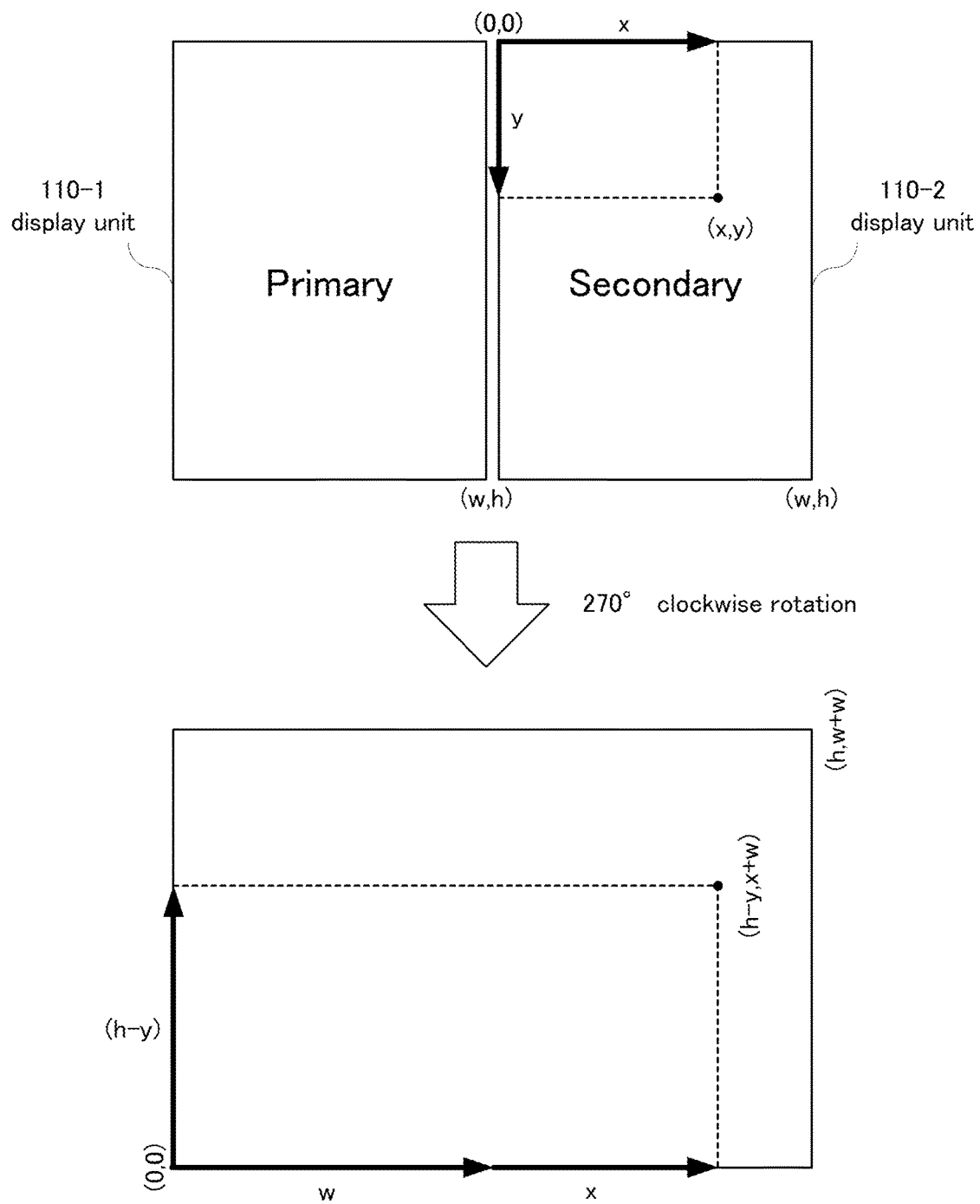
FIG. 12 shows an example of coordinate conversion when the directions of length and width of a display device are rotated clockwise 270°.

FIG. 12 shows an example of the conversion of coordinates when the directions of length and width of display device 100 are rotated clockwise 270 degrees.

When display device 100 is rotated clockwise 270 degrees, the physical coordinates (x, y) on display unit 110-2 shown in FIG. 12 are converted to virtual coordinates by coordinate conversion unit 120.

More specifically, coordinate conversion unit 120 uses Formula 9 to carry out conversion for the X coordinates.

Formula 9

$h$(size of display unit 110-1 in the $Y$-axis direction)–
$y$(physical coordinate)=($h$–$y$)      9

This (h−y) becomes the X coordinate of the virtual coordinates.

Coordinate conversion unit 120 further uses Formula 10 to carry out conversion for the Y coordinates.

Formula 10

$w$(size of display unit 110-1 in the $X$-axis direction)+
$x$(physical coordinate)=($w$+$x$)      10

This (w+x) becomes the Y coordinate of the virtual coordinates.

Accordingly, the virtual coordinates that are reported from coordinate notification unit 130 to application 140 are (h−y, w+x). Application 140 carries out processing in accordance with these coordinates (h−y, w+x).

FIG. 13 is a table showing the formulas of coordinate conversion resulting from rotation of the directions of length and width of the above-described display device 100. In FIG. 13, the virtual coordinates following conversion are shown by (x', y').

As shown in FIG. 13, the conversion from physical coordinates to virtual coordinates differs for a case of displaying on one display (either display unit 110-1 or display unit 110-2) and a case of displaying on two displays (straddling display unit 110-1 and display unit 110-2). In addition, even when displaying on two displays, the conversion from physical coordinates to virtual coordinates differs depending on the origin of the occurrence of an event (the display unit on which contact was sensed). The conversion process is therefore carried out depending on the display.

In addition, conversion to virtual coordinates may be carried out by first conferring, to each display, display identification information (such as identifying ID) that can distinguish each of a plurality of displays and then using the display identification information and the physical coordinates of the position at which contact is sensed.

In the present invention as described hereinabove, coordinates for an application can be effectively communicated in a display device having a plurality of display units by converting physical coordinates to virtual coordinates only when an application displays an image straddling a plurality of display units.

The processing that is carried out by each constituent element provided in the above-described display device 100 may be implemented by logic circuits that are each fabricated according to their purpose. In addition, a program that describes the processing content may be recorded on a recording medium that can be read in display device 100, the program that has been recorded on this recording medium then read in display device 100, and the processing thus executed. The recording medium that can be read in display device 100 refers, for example, to a removable recording medium such as a floppy (registered trademark) disk, a magneto-optical disk, a DVD, a CD, or additionally, to an HDD or memory such as ROM and RAM that is incorporated in display device 100. The program that is recorded on this recording medium is read by a CPU (not shown) that is provided in display device 100, and processing equivalent to the above-described processing is then carried out under the control of the CPU. Here, the CPU is a component that operates as a computer that executes the program that has been read from the recording medium on which the program was recorded.

Although the invention of the present application has been described hereinabove with reference to an exemplary embodiment, the invention of the present application is not limited to the above-described exemplary embodiment. The configuration and details of the invention of the present application are open to various modifications within the scope of the invention of the present application that will be clear to one of ordinary skill in the art.

This application claims the benefits of priority based on Japanese Patent Application No. 2010-213794 for which application was submitted on Sep. 24, 2010 and incorporates by citation all of the disclosures of these applications.

What is claimed is:

1. A display device comprising:
   a plurality of display units that are equipped with a touch panel function and that display an image that is information;
   a coordinate conversion unit that, when one application is displaying said image straddling said plurality of display units, uses a predetermined operation to convert physical coordinates that indicate the position at which one display unit of said plurality of display units senses contact to virtual coordinates; and
   a coordinate notification unit that, when one application is displaying said image on only one display unit among said plurality of display units, reports the physical coordinates at which said display unit senses contact to the application and, when one application is displaying said image straddling said plurality of display units, reports said virtual coordinates to the application.

2. The display device as set forth in claim 1, wherein said coordinate conversion unit converts to said virtual coordinates the physical coordinates on, from among said plurality of display units, a display unit other than a primary display unit that includes the coordinates of the origin that said application recognizes.

3. The display device as set forth in claim 2, wherein said coordinate conversion unit converts, from among said physical coordinates, the coordinate of the direction along which said primary display unit and a display unit other than the primary display unit are aligned.

4. The display device as set forth in claim 3, wherein said coordinate conversion unit carries out conversion to said virtual coordinates by adding a coordinate portion that accords with the size of said primary display unit to the physical coordinates on display units other than said primary display unit.

5. The display device as set forth in claim 1, wherein said coordinate conversion unit carries out conversion of said physical coordinates to said virtual coordinates according to movement of physical coordinates with respect to the origin that said application recognizes that is caused by rotation of the length and width of the display device.

6. A coordinate notification method in a device that is equipped with a plurality of displays having a touch panel function, comprising:
   sensing contact to said plurality of displays;
   judging whether one application is displaying said image straddling said plurality of displays;
   a conversion step of, when one application is displaying said image straddling said plurality of displays, using a predetermined operation to convert the physical coordinates that indicate the position at which said contact is sensed to virtual coordinates;

when one application is displaying said image on only one display among said plurality of displays, reporting the physical coordinates at which said contact is sensed to the application; and when one application is displaying said image straddling said plurality of displays, reporting said virtual coordinates to said application.

7. The coordinate notification method as set forth in claim 6, wherein, in said conversion step, physical coordinates on, from among said plurality of displays, a display other than a primary display that includes the coordinates of an origin that said application recognizes are converted to said virtual coordinates.

8. The coordinate notification method as set forth in claim 7, wherein, in said conversion step, from among said physical coordinates, coordinates of the direction along which said primary display and a display other than the primary display are aligned are converted.

9. The coordinate notification method as set forth in claim 8, wherein, in said conversion step, conversion to said virtual coordinates is carried out by adding to physical coordinates on a display other than said primary display a coordinate portion that accords with the size of said primary display.

10. The coordinate notification method as set forth in claim 6, wherein, in said conversion step, said physical coordinates are converted to said virtual coordinates in accordance with movement of physical coordinates that correspond to the origin that said application recognizes that results from rotation of the length and width of the device.

* * * * *